United States Patent [19]

Hakansson

[11] 3,865,015
[45] Feb. 11, 1975

[54] SEALING MEANS FOR THE PISTON ROD OF A STIRLING ENGINE

[75] Inventor: Sven Hakansson, Malmo, Sweden

[73] Assignee: Kommanditbolaget United Stirling (Sweden) AB & Co., Malmo, Sweden

[22] Filed: Oct. 2, 1973

[21] Appl. No.: 402,906

Related U.S. Application Data

[63] Continuation of Ser. No. 252,558, May 12, 1972, abandoned.

[52] U.S. Cl. ............................ 92/78, 92/86, 92/153, 92/165, 92/82
[51] Int. Cl. ... F15b 21/04, F15j 15/18, F01b 31/10
[58] Field of Search .............. 92/86, 86.5, 165, 153, 92/82, 83; 91/321; 60/517, 519, 78, 79

[56] References Cited
UNITED STATES PATENTS

| | | | |
|---|---|---|---|
| 2,204,374 | 6/1940 | Metzgar | 92/86 |
| 2,278,395 | 3/1942 | Lichte et al. | 92/86.5 |
| 2,801,618 | 8/1957 | Place et al. | 92/86 |
| 3,293,994 | 12/1966 | Napolitano | 92/86 |
| 3,487,751 | 1/1970 | Meiger et al. | 92/79 |
| 3,603,213 | 9/1971 | Tootle | 92/153 |
| 3,782,247 | 1/1974 | Klaeger | 91/321 |

*Primary Examiner*—Paul E. Maslousky
*Attorney, Agent, or Firm*—Laurence R. Brown

[57] ABSTRACT

In a Stirling Engine having a cylinder from which a piston rod extends is provided with a seal comprising a cylinder end wall member with a sequence of spaces about the rod including a labyrinth seal, a leakage gas return conduit coupled to said cylinder with a one way valve and an oil separation filter, and a pressure regulated oil filled space with the oil pressure controlled by the pressure in said conduit.

6 Claims, 1 Drawing Figure

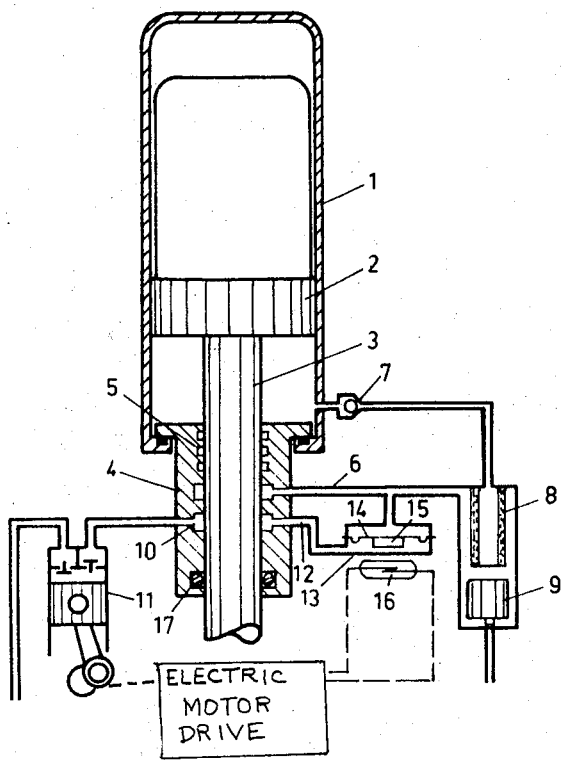

SEALING MEANS FOR THE PISTON ROD OF A STIRLING ENGINE

This is a continuation of application Ser. No. 252,558 filed May 12, 1972, now abandoned.

This invention relates to a sealing device of the kind (herein called "the kind defined") employed for limiting or preventing leakages of gas beside a rectilinearly reciprocating rod (for example a piston rod in a Stirling cycle hot gas engine) from a chamber containing gas at high cyclically-varying pressure to a gas-filled space in which the pressure is lower, there being between said chamber and said gas-filled space an element accommodating sealing means through which the rod extends.

The invention is intended to provide an improved sealing device of the kind defined which is efficient and reliable during long periods between services, and which is tolerant to normal wear and normal amounts of impurities in its surroundings.

According to the present invention there is provided a sealing device of the kind defined herein, characterized by sealing means which allow restricted passage of leakage gas from the said chamber beside the rod to a return conduit which returns the leakage gas to the said chamber and includes a non-return valve which allows gas to flow through the return conduit only in the direction towards the said chamber.

The scope of the monopoly sought is defined in the claims hereinafter, and how the invention can be put into practice is described in more detail with reference to the accompanying drawing which shows in vertical section a sealing device according to the invention used with a piston rod in a hot gas engine.

Referring to the drawing, a cylinder 1 has a piston 2 axially movable therein. The piston 2 is provided with a rectilinearly reciprocating piston rod 3 which extends through an end wall 4, the latter constituting an element accommodating sealing means. The chamber in the cylinder 1 limited by the cylinder wall, the piston 2 and the end wall 4 contains working gas which will have high cyclically-varying pressure during operation of the engine.

The gas pressure in the said chamber may vary between e.g. 175 and 225 kgp per cm². Between the piston rod 3 and the end wall 4 there is a labyrinth seal 5 starting at the surface of the wall 4 limiting the interior of the cylinder 1. This labyrinth seal 5 allows restricted passage of gas from the interior of the cylinder 1 to a return conduit 6 containing a non-return valve 7 and an oil-separator 8. An annular channel in the element 4 around the rod 3 forms part of the return conduit 6. Oil accumulated by the oil-separator 8 will be discharged by an oil-bleeding valve 9.

The end wall 4 also contains an annular channel forming an oil-filled space 10 surrounding the piston rod 3 and located at a small axial distance from the labyrinth seal 5. The said annular space 10 is supplied with oil from an oil pump 11 driven by a separate electric motor. A conduit 12 connects the space 10 with a lower chamber of a pressure-responsive device 13 having an upper chamber connected to the conduit 6. The two chambers of the device 13 are separated from each other by a membrane or flexible diaphragm 14 carrying a magnet 15 governing a switch 16 in an electric circuit supplying electricity to the motor of the pump 11. The chamber 12 is to be operated at a pressure provided by the pump 11 slightly higher than that in conduit 6 (which is kept at a constant pressure of about 175 kgp per cm² because of non-return valve 7). The pump is operated by switch 16 until the pressure exceeds the predetermined difference of operation pressures between conduits 6 and 12 when magnet 15 will be removed farther from switch 16 to open it and stop the pump until the desired pressure difference is again reached.

The end wall 4 is provided with an O-ring seal 17 at its end remote from the interior of the cylinder 1. This O-ring seal 17 will form a positive seal when no relative movements take place between the piston rod 3 and the end wall 4.

The device described will operate as follows:

The working gas at pressures varying cyclically between two levels will try to escape through the passage constituted by the labyrinth seal 5, due to the fact that a pressure corresponding to the lower one of the two levels will prevail in the conduit 6 (because of the non-return valve 7). Oil is supplied to the annular space 10 at a pressure set by the pressure-responsive device 13. Said set pressure is slightly above the pressure in the conduit 6 and ensures that a small amount of oil is constantly fed into the flow of gas to the oil-separator 8.

In case the engine is stopped the O-ring seal 17 will prevent flow of oil along the piston rod 3 in the direction towards the outer free surface of the end wall 4. During operation of the engine a small leakage of oil past the O-ring seal 17 could be tolerated.

The end wall 4 is mounted in the cylinder 1 in such a way that small radial relative movements between the wall 4 and the cylinder 1 can be accepted. For this purpose an O-ring seal is provided between said wall 4 and said cylinder 1.

It will be understood that with a sealing device according to the invention all gas passing the labyrinth seal will be sucked back into the cylinder automatically during the periods in which the minimum pressure prevails in the cylinder chamber containing the working gas below the piston.

What is claimed is:

1. A sealing device for a piston rod extending from a cylinder allowing restricted passage of leakage gas from the cylinder alongside said rod comprising in combination, an end wall member for said cylinder through which said piston rod extends, a space about said rod in said wall member receiving said leakage gas from said cylinder, a return conduit from said space to said cylinder, and a non-return valve in said conduit which allows gas to flow through said return conduit only in the direction towards said cylinder and including a further space comprising an annular channel in said wall member surrounding said rod at a position along the axis of said rod further away from said cylinder than the first said space, and means filling said further space with oil at a pressure greater than that in said first space to cause oil to flow toward said first space.

2. A sealing device as defined in claim 1 including an oil separating device in said return conduit.

3. A sealing device as defined in claim 1 including a third space about said rod in said wall member about said rod provided with a sealing member and located on said rod on the opposite side of said channel filled with oil from the first said space, whereby said source for oil under pressure is connected supplying oil to said third space.

4. A sealing device as defined in claim 3 including means sensing the pressure of gas in said cylinder and the further said space and means responsive thereto governing the pressure of oil from said source.

5. A sealing device as defined in claim 3 wherein said sealing member is between said wall member and said rod providing a positive seal between the rod and said wall member when no relative movements take place.

6. A sealing device as defined in claim 1 including a labyrinth seal in said wall member surrounding said rod between said first space and said cylinder.

* * * * *